United States Patent [19]

Crouch et al.

[11] Patent Number: 5,796,821
[45] Date of Patent: *Aug. 18, 1998

[54] HEARING AID TELEPHONE INTERCONNECT SYSTEM

[76] Inventors: Shirley Aline Crouch, 7050 Goldsmith Ct., Colorado Springs, Colo. 80911; James D. Potter, 4955 E. Dahila Dr., Scottsdale, Ariz. 85254; Joan Phillips Waldron, 138 Kilgore St., Colorado Springs, Colo. 80911

[*] Notice: This patent issued on a continued prosecution application filed under 37 CFR 1.53(d), and is subject to the twenty year patent term provisions of 35 U.S.C. 154(a)(2).

[21] Appl. No.: 512,563

[22] Filed: Aug. 8, 1995

Related U.S. Application Data

[63] Continuation of Ser. No. 177,557, Jan. 5, 1994, abandoned.

[51] Int. Cl.[6] ............................................ H04M 1/00
[52] U.S. Cl. ........................... 379/430; 379/52; 381/68.7
[58] Field of Search ............................ 379/442, 430, 379/433, 52; 381/68, 68.4, 68.2, 68.5, 68.6, 68.7

[56] References Cited

U.S. PATENT DOCUMENTS

| | | | |
|---|---|---|---|
| 3,862,378 | 1/1975 | Norris | 179/156 A |
| 4,137,431 | 1/1979 | Pallesen | 179/107 H |
| 4,403,120 | 9/1983 | Yoshimi | 179/182 R |
| 4,420,657 | 12/1983 | Larkin | 179/156 A |
| 4,539,439 | 9/1985 | Strothmann et al. | 179/107 R |
| 4,701,958 | 10/1987 | Neth | 381/68 |
| 4,723,293 | 2/1988 | Harless | 381/68 |
| 4,930,156 | 5/1990 | Norris | 379/388 |
| 5,058,155 | 10/1991 | Larsen | 379/442 |
| 5,086,464 | 2/1992 | Groppe | 379/430 |
| 5,091,952 | 2/1992 | Williamson et al. | 381/68.2 |

FOREIGN PATENT DOCUMENTS

| 142417 | 6/1980 | Germany | 379/52 |
|---|---|---|---|

*Primary Examiner*—Jack Chiang
*Attorney, Agent, or Firm*—William E. Hein

[57] ABSTRACT

A hearing aid telephone interconnect system for permitting hearing impaired persons to use conventional telephone instruments employs a T-coupler adapted to hook over the ear of a user of a conventional behind-the-hear, in-the-ear, or eyeglass hearing aid of the type employing an input T-coil. The T-coupler, as well as the telephone base unit and the telephone receiver, are connected to an adaptor box that permits switching the telephone receiver signal between the telephone receiver and the T-coupler to permit use of the telephone by persons with and without hearing impairment. When interfacing the T-coupler to cellular telephones and princess style landline telephones in which the touchtone keypad and receiver form an integrated unit, the adaptor box may be eliminated because switching of the receiver signal is not necessary. In order to permit the use by hearing impaired persons of various other products that produce an audible sound, it is only necessary to provide an electrical connection between the T-coupler and an output audio signal of those products.

4 Claims, 2 Drawing Sheets

HEARING AID TELEPHONE INTERCONNECT SYSTEM

CROSS REFERENCE TO RELATED APPLICATION

This application is a continuation of application Ser. No. 08/177,557, filed Jan. 5, 1994, now abandoned.

BACKGROUND OF THE INVENTION

This invention relates generally to hearing aids and more particularly to an interconnect system for electronically coupling a conventional hearing aid to an audio signal such as that supplied by landline and cellular telephones, as well as by computers, stereo sound systems, tape cassette players, televisions, radios, compact disc players, laser disc players, telephone answering machines, telecopiers, electronic keyboards, aircraft communication systems, etc.

The more than 30 million hearing impaired persons in the U.S. alone are presently unable to use standard telephone instruments that are in common use by persons having normal hearing ability. A number of so-called TDD products (telecommunication devices for the deaf) are available in the marketplace. These products are typically nothing more than terminals that transmit typed messages over telephone lines to a compatible terminal or to relay operators at the receiving end of the line. These prior art TDD terminals are disadvantageous in that they do not meet the accessiblity needs of hearing impaired persons. Sound amplification products also exist in the prior art, but they simply do not amplify to the extent required to benefit a hearing disabled person. The 18–30 decibels of amplification typically realized from these prior art amplification products will not benefit a person suffering from even a moderate hearing loss, let alone one who is profoundly deaf.

Exemplary of the prior art related to the present invention are several U.S. patents located by applicants in the course of a preliminary novelty search. U.S. Pat. No. 3,862,378 to Norris is directed to an ear set with miniaturized electronic sound receiving and emitting equipment, in which the housing contains all or a portion of the electronic equipment and has pivotally connected thereto a spring loaded lever to be placed behind the ear, the free end of which is by the preloaded spring continuously urged toward the housing.

U.S. Pat. No. 4,137,431 to Pallesen is directed to a cable connector for the connectin of an electrical cable to or near the ear placed hearing aid, for instance, hearing spectacles or a hearing aid placed behind the ear. The connector comprises terminals secured to the cable, which terminals contact corresponding terminals in the housing during the conecting action. The cable connector further comprises a terminal holder secured to the cable, and the cable connector is arranged to engage around and come into snap engagement with the hearing aid. Pairs of corresponding terminals are mounted with one terminal in the cable connector secured to the cable in such a way as to be placed opposite each other by connecting operation and to press resiliently against each other.

U.S. Pat. No. 4,403,120 to Yoshimi is directed to a high performance and compact earphone which includes a speaker unit and a case in which the speaker unit is mounted. The earphone is firmly fitted in the ear cavity by the resilience and friction of the ear.

U.S. Pat. No. 4,420,657 to Larkin is directed to a lightweight adjustable headset for use with telephones including a housing having a microphone boom mounted in a manner to permit rotational and translational movement.

U.S. Pat. No. 4,539,439 to Strothmann et al. is directed to a connecting cord having a plug at each end, either of which can be plugged into a receptacle hearing aid while the other plug is plugged into an external microphone.

U.S. Pat. No. 4,701,958 to Neth is directed to an automatic gain control circuit for an output signal of a magnetic earpiece of a hearing aid, which comprises a voltage source, an output amplifier stage having an input connected to the voltage source and an output connected to the magnetic earpiece, the earpiece having a working winding connected between the amplifier stage output and the voltage source, and a control loop for automatic gain control.

U.S. Pat. No. 4,723,293 to Harless is directed to a hearing aid apparatus having a housing containing components such as a microphone, an amplifier, and an earphone. A terminal having contacts for connection to a signal line is applied to the housing.

U.S. Pat. No. 4,930,156 to Norris is directed to a telephone speaker/microphone device for suspending in a user's ear to enable hands-free communication without feedback. The device utilizes control circuitry which is capable of interconnecting microphone and speaker leads from a telephone or other communication device to a speaker element and microphone element which are embodied in a single earpiece and suspended at the user's ear. The speaker element and microphone element are positioned sufficiently close and are wired so that the speaker signal is approximately 180 degrees out of phase with the microphone signal and results in cancellation of feedback by virtue of the out-of-phase relationship.

U.S. Pat. No. 5,058,155 to Larsen is directed to a multipurpose headset amplifier for connecting a headset to a telephone instrument. The device comprises a housing having an ascending, thready holder for a headset, the telephone instrument and for the telephone instrument's handset. The housing has, at the upper side thereof, a manual operating member for the adjustment of the device, and manual controls at the underside for the adaptation of a headset to the impedance and signal level of any telephone instrument.

U.S. Pat. No. 5,086,464 to Groppe is directed to an adjustable telephone headset for the hearing impaired comprising a left and a right ear piece, a speaker within each ear piece, an input device, such as a microphone or magnetic induction pickup within one of the ear pieces, and an amplifier connected between the input device and the speaker. Optionally, a switch may select between either a microphone receiver against the microphone or a magnetic induction pickup as the choice of input device. A wearer of the headset may place a telephone receiver against the microphone or magnetic induction pickup, allowing an amplified telephone conversation to be heard by both ears.

The prior art sound amplification systems typified by the foregoing references have simply not provided sufficient clarity, especially for those persons suffering severe hearing impairment.

SUMMARY OF THE INVENTION

It is therefore the principal object of the present invention to provide a hearing aid telephone interconnect system for connection between a telephone instrument and a conventional hearing aid of the type employing an input T-coil to thereby greatly improve the clarity of the telephone sounds to the hearing impaired wearer of the hearing aid.

It is a further object of the present invention to provide a hearing aid interconnect system for connection between any source of an audio signal and a conventional hearing aid of the type employing an input T-coil to thereby enable the hearing impaired wearer of the hearing aid to hear the audio signal with greatly improved clarity.

These and other objects are accomplished in accordance with the illustrated preferred embodiment of the present invention by providing a T-coupler adapted to hook over the ear of a user of a conventional hearing aid that employs an input T-coil. Such hearing aids include those that fit behind the ear, in the ear, and on eyeglasses. The T-coupler, as well as the telephone base unit and the telephone receiver, are connected to an adaptor box that permits switching the telephone receiver signal between the receiver and the T-coupler to permit use of the telephone by persons with and without hearing impairment. When interfacing the T-coupler to cellular telephones and princess style landline telephones in which the touchtone keypad and receiver form an integrated unit, the adaptor box may be eliminated because switching of the receiver signal is not necessary. In order to permit the use by hearing impaired persons of various other products that produce an audible sound, it is only necessary to provide an electrical connection between the T-coupler and an output audio signal of those products. These products include computers, stereo sound systems, tape cassette players, televisions, radios, compact disc players, laser disc players, telephone answering machines, telecopiers, electronic keyboards, and aircraft and other communications systems, for example.

DETAILED DESCRIPTION OF THE PREFERRED EMBODIMENTS

Figure 1:
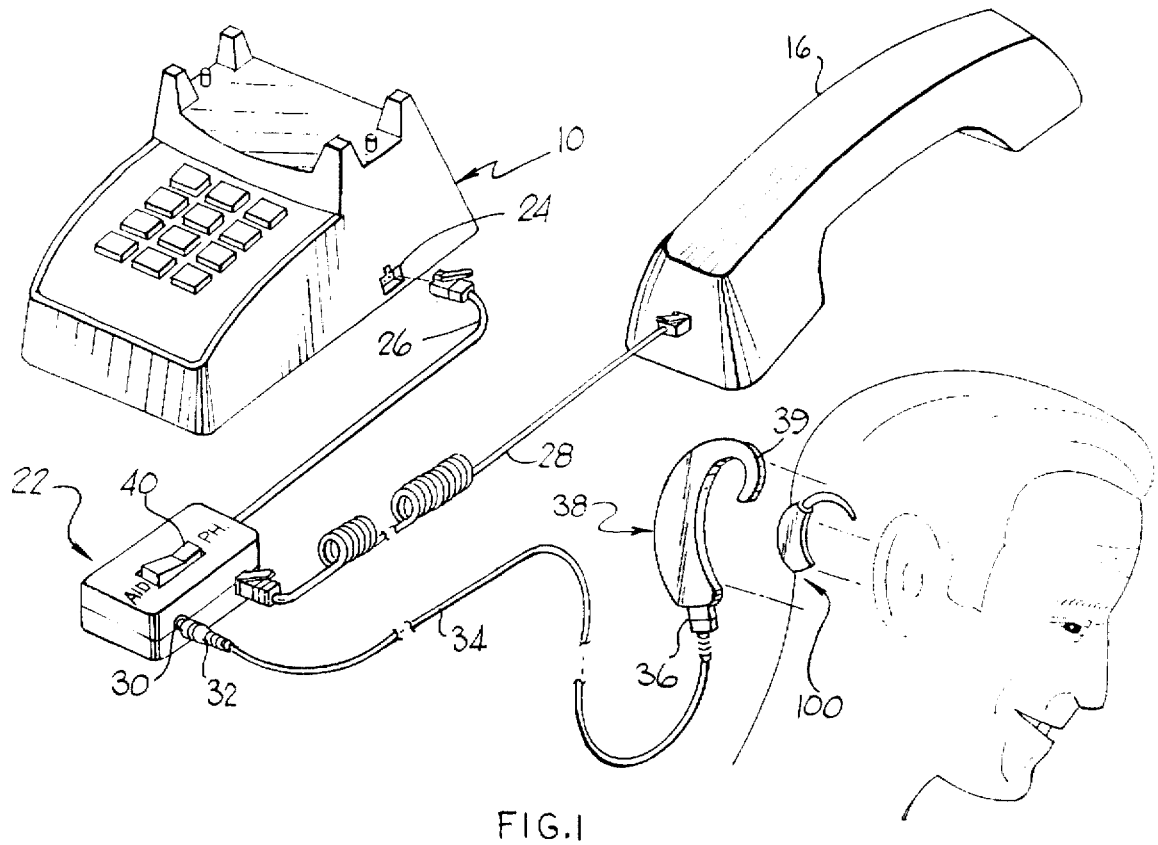
FIG. 1 is a pictorial diagram illustrating how the hearing aid telephone interconnect system of the present invention is connected for use with a conventional landline telephone.
Figure 2:
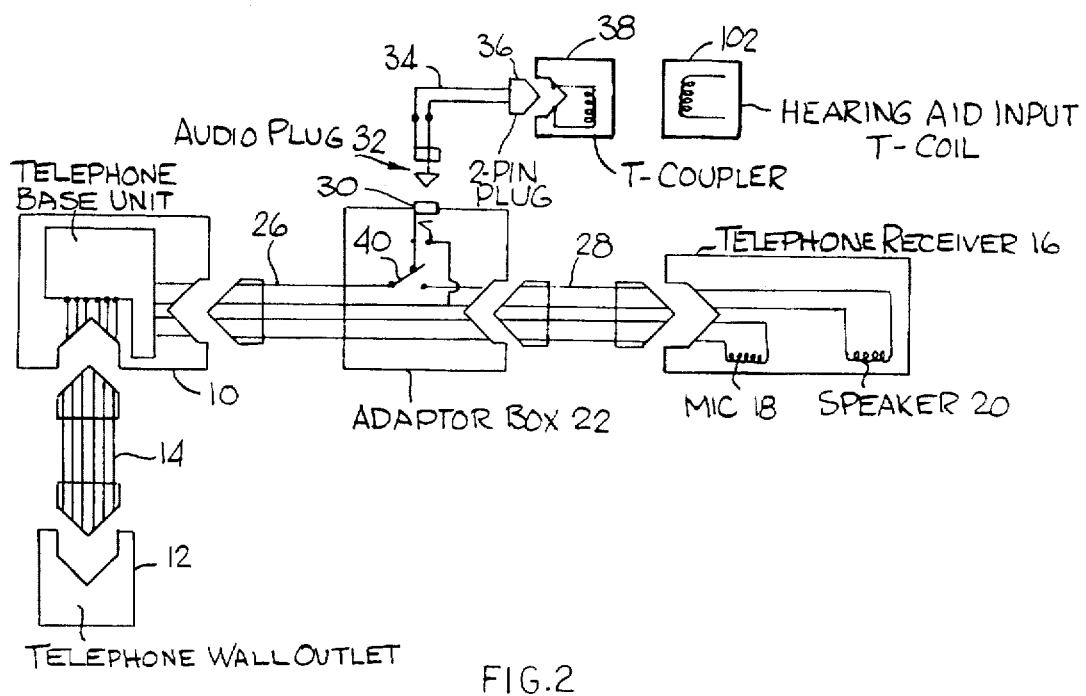
FIG. 2 is a detailed schematic diagram of the electrical connections between the hearing aid telephone interconnect system and conventional landline telephone of FIG. 1.
Figure 3:
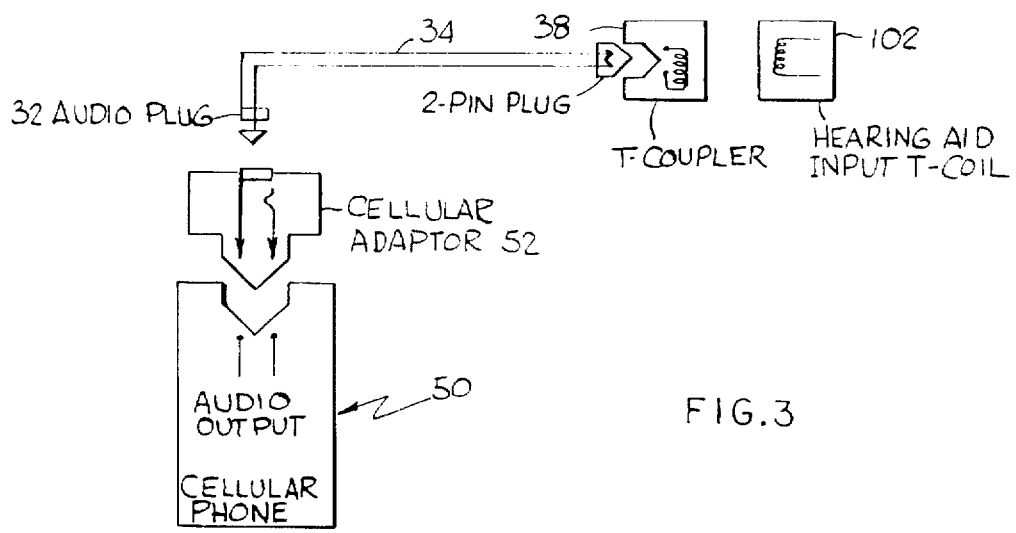
FIG. 3 is a detailed schematic diagram illustrating how the T-coupler component of the hearing aid telephone interconnect system of FIG. 1 is connected to a conventional cellular telephone.

Referring now to FIGS. 1 and 2, there is shown a hearing aid telephone interconnect system connected for use with a conventional landline telephone having a base unit 10 that is connected to a wall outlet 12 via a cable 14. The telephone includes a conventional telephone receiver 16 that contains a microphone 18 and a speaker 20. An adaptor box 22 of the present invention is connected to a conventional receiver receptacle 24 on telephone base unit 10 via a cable 26. Receiver 16 is, in turn, connected to adaptor box 22 via a conventional coiled cord 28. A conventional audio jack 30 is provided on adaptor box 22 to receive an audio plug 32 at one end of a T-coupler cable 34. The other end of T-coupler cable 34 is fitted with a conventional 2-pin plug 36 that is plugged into a T-coupler 38.

Figure 6:
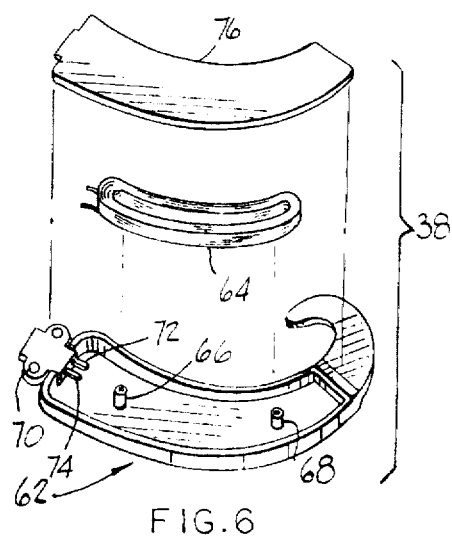
FIG. 6 is an assembly diagram of the T-coupler component of the hearing aid telephone interconnect system of FIG. 1.

Adaptor box 22 contains a switch 40 that allows the user to switch the audio signal from telephone base unit 10 between handset 16 when the telephone is being used by a person without a hearing impairment and T-coupler 38 when the telephone is being used by a hearing impaired person. T-coupler 38 is constructed as illustrated in the detailed assembly diagram of FIG. 6 to include a base member 62 having a cavity for receiving a pre-wound coil 64. Coil 64 is preferably pre-wound with 360 turns of 40-gauge magnet wire and is pre-formed during winding to have a substantially square cross-section. Coil 64 is placed over a pair of upwardly extending guide pins 66, 68 in base member 62 that serve to hold coil 64 in place. A miniature receptacle 70, is provided on T-coupler 38 to receive plug 36 on the end of T-coupler cable 34. Coil 64 is soldered or otherwise electrically connected to a pair of connector pins 72, 74 on receptacle 70. Any of a number of commercially available silastic or expoxy materials may be used to fill the remaining space within base member 62 to thereby hold coil 64 firmly in place once it has been installed in base member 62. A cover 76 is then placed over base member 62 to complete the assembly of T-coupler 38. T-coupler 38 is formed, as illustrated in FIGS. 1 and 6, to be arcuate in shape to generally correspond to the arcuate shape of a user's ear and of a conventional behind-the-ear hearing aid 100. T-coupler 38 is also formed to include a hook portion 39 that fits over the user's ear in the same manner as hearing aid 100 is fitted over the user's ear. In operation, T-coupler 38 is placed alongside behind-the-ear hearing aid 100 and hooked over the user's ear so that the body portion of T-coupler 38 is positioned against the body portion of hearing aid 100 to provide optimal inductive coupling of an audio signal from T-coupler 38 into an input T-coil 102 of hearing aid 100, illustrated schmatically in FIG. 2. When used with in-the-ear hearing aids and those that are mounted on the temple piece of a pair of eyeglasses, T-coupler 38 is similarly hooked over the user's ear.

Figure 5:
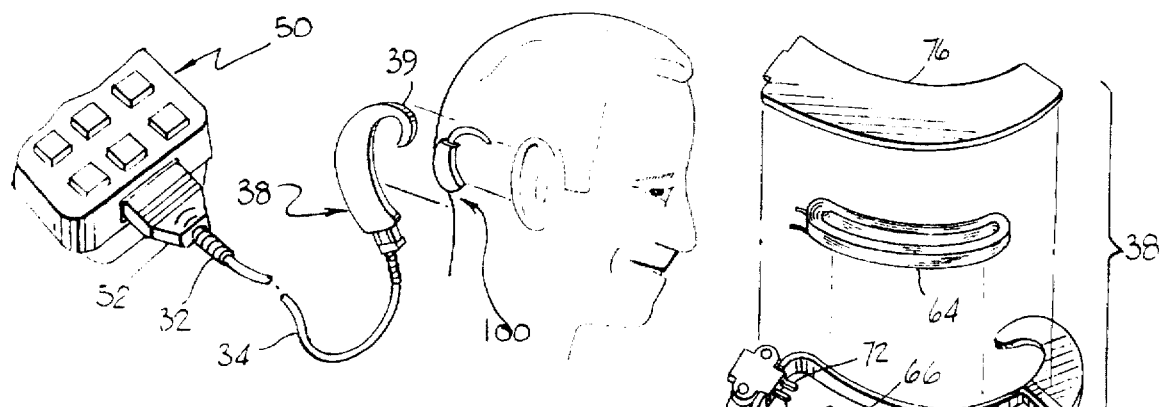
FIG. 5 is a pictorial diagram illustrating the use of the T-coupler component of the hearing aid telephone interconnect system of FIG. 1 with a conventional cellular telephone, in accordance with the schematic diagram of FIG. 3.

Referring now to FIG. 5, there is shown a pictorial diagram of the way in which T-coupler 38 may be connected to an interface receptacle of a conventional cellular telephone to permit the use thereof by hearing impaired persons. A cellular adaptor 52 is provided to receive audio plug 32 at the end of T-coupler cable 34 and to in turn be plugged into the interface receptacle of a conventional cellular telephone 50 to thereby convey the audio output of cellular telephone 50 to T-coupler 38.

Figure 4:
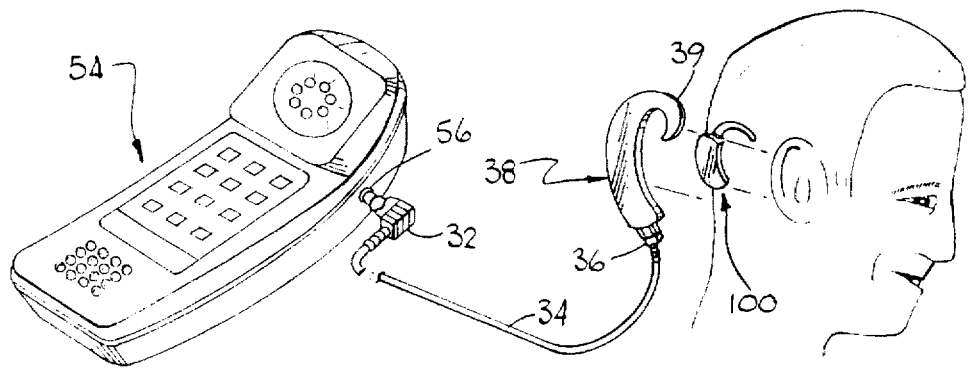
FIG. 4 is a pictorial diagram illustrating how the T-coupler component of the hearing aid telephone interconnect system of FIG. 1 is connected to a conventional landline telephone of the princess style in which the touchtone keypad and the receiver form an integrated unit.

Referring now to FIG. 4, there is shown a pictorial diagram of the way in which T-coupler 38 may be connected to a conventional landline telephone 54 of the princess style in which the touchtone keypad and the receiver form an integrated unit. In these types of telephones, it is necessary to provide a jack 54 at which the receiver audio signal is made available and into which audio plug 32 at the end of T-coupler 38 may be inserted.

While the hearing aid interconnect system of the present invention has been described as being particularly useful in providing access by the hearing impaired to various types of conventional landline and cellular telephone instruments, the system is equally useful in permitting hearing impaired persons to enjoy the use of other products that produce an audio sound, such as computers, stereo music systems, tape cassette players, televisions, radios, compact disc players, laser disc players, telephone answering machines, telecopiers, electronic keyboards, aircraft and other communication systems, etc. In order for the hearing impaired to use such products, it is only necessary to provide a connection between T-coupler 38 and an output audio signal of those products.

We claim:

1. A method for enabling use of a conventional landline telephone employing separate base and receiver units by a hearing impaired person, said hearing impaired person using a conventional hearing aid employing an input T-coil within an earpiece, the method comprising the steps of:

providing a T-coupler separate from the hearing aid, the T-coupler being adapted to be hooked over the user's ear proximate said earpiece and being arcuate in shape to correspond with a shape of the user's ear;

hooking the T-coupler over the user's ear proximate said earpiece;

switching a telephone receiver audio signal from the telephone receiver to the T-coupler;

transmitting the telephone receiver audio signal to the T-coupler; and inductively coupling the telephone receiver audio signal from the T-coupler into the input T-coil of the hearing aid earpiece.

2. A method for enabling use of a cellular telephone by a hearing impaired person, said hearing impaired person using a conventional hearing aid employing an input T-coil within an earpiece, the method comprising the steps of:

providing a T-coupler separate from the hearing aid, the T-coupler being adapted to be hooked over the user's ear proximate said earpiece and having a T-coupler cable;

hooking the T-coupler over the user's ear proximate said earpiece;

connecting the T-coupler cable to the cellular telephone;

transmitting a telephone receiver audio signal from the cellular telephone to the T-coupler through the T-coupler cable; and inductively coupling the telephone receiver audio signal from the T-coupler into the input T-coil of the hearing aid earpiece.

3. A method for enabling use of a cellular telephone by a hearing impaired person, said hearing impaired person using a conventional hearing aid employing an input T-coil within an earpiece, the method comprising the steps of:

providing a T-coupler separate from the hearing aid, the T-coupler being adapted to be hooked over the user's ear proximate said earpiece and having a T-coupler cable;

receiving an incoming telephone call on the cellular telephone;

hooking the T-coupler over the user's ear proximate said earpiece;

connecting the T-coupler cable to the cellular telephone;

transmitting a telephone receiver audio signal from the cellular telephone to the T-coupler through the T-coupler cable;

inductively coupling the telephone receiver audio signal from the T-coupler into the input T-coil of the hearing aid earpiece;

completing the telephone call;

disconnecting the T-coupler cable from the cellular telephone; and removing the T-coupler from the user's ear.

4. A method for enabling use of a conventional landline telephone system by a hearing impaired person and by a non-hearing impaired person, said hearing impaired person using a conventional hearing aid employing an input T-coil within an earpiece, the conventional landline telephone system having a base unit with a receiver receptacle, comprising the steps of:

connecting an adapter box having a switch to the base unit through the receiver receptacle;

connecting a receiver unit to a first input of the adapter box;

providing a T-coupler separate from the hearing aid, the T-coupler being adapted to be hooked over the user's ear proximate said earpiece and having a T-coupler cable;

connecting the T-coupler cable to a second input of the adapter box;

receiving an incoming telephone call;

switching the adapter box to the receiver unit;

transmitting a telephone receiver audio signal from the adapter box to the receiver unit;

using, by the non-hearing impaired person, the conventional landline telephone system to communicate with an incoming caller;

hooking the T-coupler over the hearing-impaired person's ear proximate said earpiece;

switching the adapter box to the T-coupler;

transmitting the telephone receiver audio signal from the adapter box to the T-coupler through the T-coupler cable;

inductively coupling the telephone receiver audio signal from the T-coupler into the input T-coil of the hearing aid earpiece; and using, by the hearing impaired person, the conventional landline telephone system to communicate with the incoming caller.

* * * * *